| United States Patent [19] | [11] | 4,021,579 |
|---|---|---|
| Barrett | [45] | May 3, 1977 |

[54] ACCELERATED PRODUCTION OF FERMENTED ALCOHOLIC BEVERAGES

[76] Inventor: Harold F. Barrett, 5550 Columbia Pike, Arlington, Va. 22204

[22] Filed: Nov. 20, 1975

[21] Appl. No.: 633,974

Related U.S. Application Data

[63] Continuation-in-part of Ser. No. 252,656, May 12, 1972, abandoned.

[52] U.S. Cl. .................................. 426/11; 99/276; 99/277.1; 426/15
[51] Int. Cl.² ...................... C12G 1/00; C12G 3/00
[58] Field of Search ................. 426/15, 330.4, 312, 426/316, 319, 16; 99/276, 277, 277.1

[56] References Cited

UNITED STATES PATENTS

| 3,123,475 | 3/1964 | Wendt et al. | 426/16 |
|---|---|---|---|
| 3,528,817 | 9/1970 | Barrett et al. | 426/15 |
| 3,900,571 | 8/1975 | Johnson | 426/15 |

OTHER PUBLICATIONS

Amerine et al., The Technology of Wine Making, 2nd Ed., The Ari Publ. Co. Inc., Westport, Conn. 1967, (pp. 19, 142, 185, 186, 191, 200, 215, 279–288, 325, 329, 375–376, 429, 455, 457, 459, 461, 475–484, 678–683).

Primary Examiner—David M. Naff
Attorney, Agent, or Firm—Colton & Stone, Inc.

[57] ABSTRACT

The production of fermented alcoholic beverages in large volumes such as wine is accelerated by a process of introducing a fermentable mixture into a large volume batch container so that a portion of the container volume remains unfilled, substantially evacuating the unfilled volume of the container to produce an anaerobic environment within the container, introducing an outside source of fermentation gas into the unfilled volume of the container while maintaining the anaerobic environment, allowing fermentation to proceed and increase gaseous pressure, periodically reducing the gaseous pressure to a lower pressure limit when a pressure upper limit is reached, continuing periodic pressure reduction until primary fermentation is complete, and allowing aging to occur under controlled pressure of fermentation gas until aging is complete as indicated by a certain drop in pressure or by chemical analysis. Pressure is controlled by passing fermentation gas from the container to a reservoir tank or by passing fermentation gas from the reservoir tank to the container.

2 Claims, 2 Drawing Figures

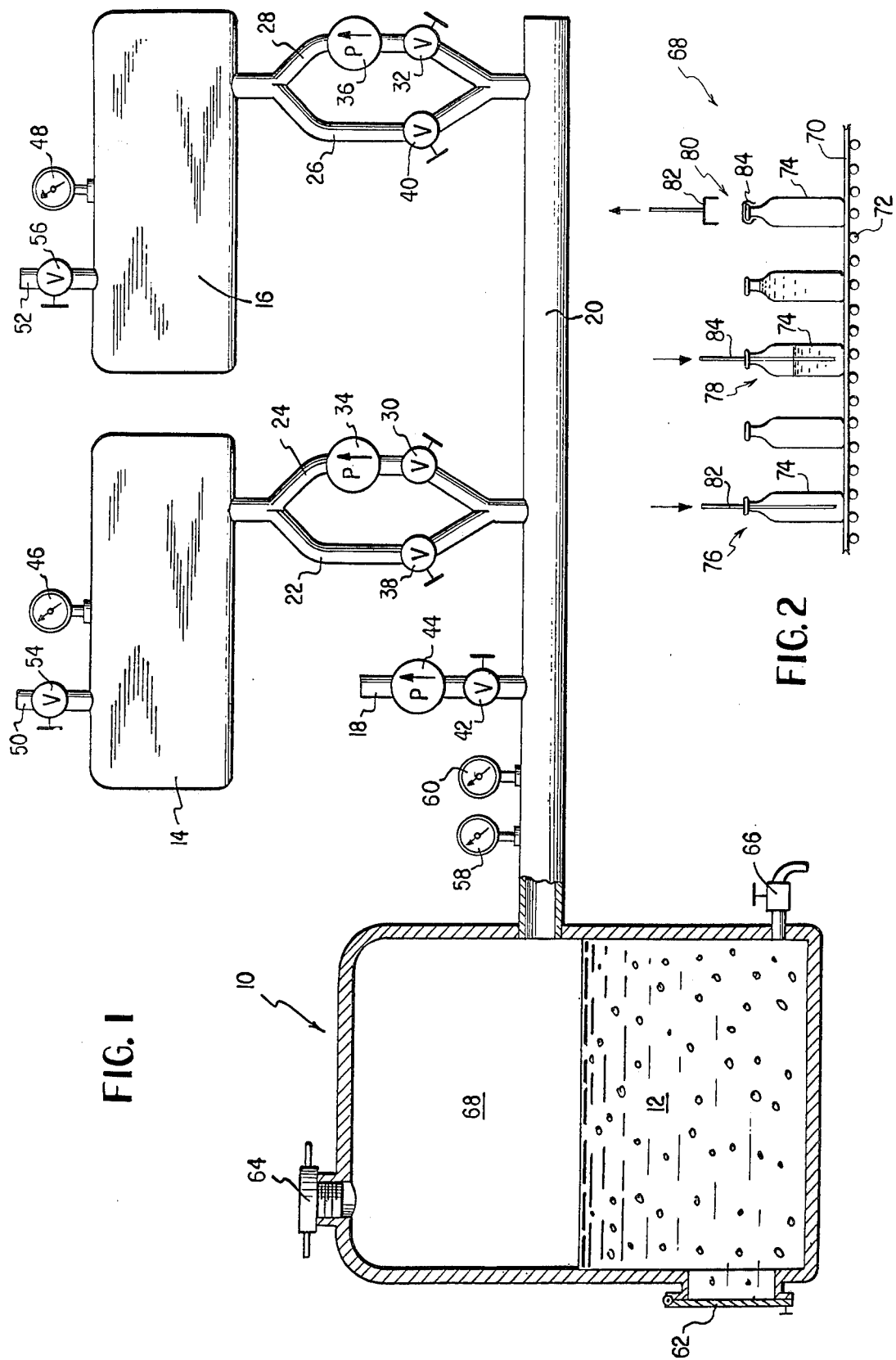

ACCELERATED PRODUCTION OF FERMENTED ALCOHOLIC BEVERAGES

CROSS REFERENCE TO RELATED APPLICATION

This is a continuation-in-part of application Ser. No. 252,656 filed May 12, 1972 now abandoned.

BACKGROUND OF THE INVENTION

The invention relates to that concept of winemaking introduced by U.S. Pat. No. 3,528,817 whose disclosure is herein incorporated by reference. The concept embodied therein is that of reducing winemaking time from a matter of years to approximately three weeks by the pressure containment of carbon dioxide and other gaseous products evolved during fermentation in open communication with the fermentable mixture. The aforesaid prior patent relates to small, home winemaking kits and the pressure containment is effected by an energy storing resilient bladder.

It is the purpose of this invention to extend the concept to large scale commercial operations.

The following detailed discussion of those conclusions derived from an extended practice of the patented invention as applied to small home winemaking kits will facilitate an understanding of the manner in which the concept may be adapted to commercial winemaking. As pointed out in the aforesaid patent, the precise chemical reactions and theoretical considerations underlying the fantastic acceleration in winemaking time were not completely understood at that time; it being clear, however, that pressure containment of the gaseous products evolved during fermentation in open communication with the fermentable mixture did produce the desired result.

It became apparent from the practice of the patented invention that the excellent quality of the wine obtained thereby in approximately three weeks could not be due solely to an accelerated fermentation time since the concept of "aging" is essential to quality wine. It was therefore assumed that some process was taking place concomitantly with the fermentation process which produced either some unknown reaction resulting in a palatable product indistinguishable from time aged wine or that actual aging was also taking place at a fantastically accelerated rate. The latter is now known to be the case and it is thought that fermentation proceeds substantially to completion within 7-10 days while the remainder of the time is taken up with the aging process.

It will be recalled from the prior patent disclosure that the initial fermentation rate is extremely rapid which appears to be explainable, at least in the first instance, by the fact that the apparatus is evacuated thus providing a maximal partial pressure differential across the liquid-gas interface. This initial situation is radically altered, almost immediately, as the evolved fermentation gases fill the container and commence to extend the bladder. The fermentation rate then increases dramatically which was thought to be explainable by the fact that the evolved gases are continually being driven back into solution as a function of their increasing partial pressures across the gas-liquid interface, to, in effect, catalyze the fermentation reaction. The increasing partial pressures exerted by the evolved gases is, of course, a direct function of bladder distension which, in turn, is a function of fermentation time. During the initial portions of the fermentation period, partial pressures across the liquid-gas interface, i.e. the evolving gas pressures greatly exceed those across the gas-liquid interface, i.e. the gases returning into solution. At a point in time just prior to substantial completion of the fermentation period (7-10 days) the gases passing into and out of solution reach equilibrium and it is at this point in time when the bladder has reached its maximum distension thereby containing a maximum volume of evolved gases and exerting maximum pressure thereon. Although fermentation is thought to continue, to some degree; the equilibrium has shifted and net mass flow is back into solution as the bladder starts to contract. This situation obtains with the bladder contracting until the winemaking process is substantially complete at which time substantially all gas flow is across the gas-liquid interface and into solution. It is the latter period of the home winemaking process, with the bladder collapsing, which is now thought to constitute a distinct aging period.

Like the fantastically accelerated fermentation rate, aging of the fermented mixture is also greatly accelerated. With recognition of the fact of aging and awareness of the individual factors contributing to aging, it was found that the same could be controlled, in small home winemaking kits, in the manner disclosed in applicant's co-pending application Ser. No. 245,442 filed Apr. 19, 1972.

Briefly, it is the volume of evolved gases which are driven back into solution following the initial fermentation period that controls aging. It is assumed, though not yet verified, that the aging process is taking place to some small degree during the fermentation period of the first few days but that the great proportion of the aging process takes place following substantial cessation of fermentation. In any event it appears clear that aging is a direct function of the integral of instantaneous gaseous volume absorbtion over a time interval extending approximately between the maximum bladder extention and collapse of the same.

Surprisingly, overaging was the primary problem plaguing the successful practice of the prior patented invention. Overaged wine is that whose end acid concentration is too high and is characterized by a fruity or vinegary taste (depending upon the particular wine and degree of aging) and a generally brownish coloration. For reasons which were not completely understood prior to extensive testing on a commercial basis, substantially complete evacuation of the apparatus (to approximately 0.1 atm. for example) prior to the commencement of fermentation was known to be critical to the accelerated production of palatable, properly aged wines. Similarly, it was known that the apparatus must remain sealed with respect to atmosphere during the entire fermentation and aging periods.

Thus, the conceptual criteria derived from extended observation and experimentation based upon the small winemaking kits employing resilient bladders to effect the desired pressure containment which it is the purpose of this invention to extend to commercial winemaking operations are threefold:

1. Initial evacuation of the apparatus;
 2. Pressure control of fermentation gases in contact with the fermenting mixture to accelerate fermentation; and
 3. Volume control of fermentation gases driven back into solution during the aging period to control aging.

The large scale commercial operations contemplated herein may involve batch containers or fermenters whose volumetric capacity may exceed a 100 gallon batch by 20%–100% or a 100,000 gallon batch by 20%–100%. Stated differently, the volumetric capacity of the batch container must exceed the initial volume of the fermentable mixture but the excess volume may vary within wide limits. It is immediately apparent that the use of a resilient bladder to control volume and pressure would be an impractical approach. Moreover, the minor variations in quality control that are permissible for home winemaking units involving small batches where the control is exercised more or less empirically as a function of expanded bladder size cannot be tolerated in commercial winemaking operations for many reasons, one of the more obvious of which is the financial loss that would be entailed if even one 100,000 gallon batch were ruined. A critical problem in connection with large capacity fermenters which does not exist in small capacity winemakers, if the accelerated winemaking time is to be maintained, is one of surface area exposure and it is this precise point that requires radical departure from the aforesaid concepts applicable to small, home winemakers. Thus, while fermentation gases may evolve freely from a one (1) gallon batch and the returning gases move more or less readily into homogenous solution with the small volume fermentable mixture; it will be appreciated that the far lesser percentage surface area exposure in a 100,000 gallon batch or even in a 100 gallon batch would insure lesser proportional reaction rates. Since it is desired to maintain the very short winemaking periods achieved with the small units; it is necessary to either further increase the previously noted reaction rates or increase surface area exposure. Actually, both of these are effected as a function of two conceptual changes in the method of operation previously outlined for small winemaking units, i.e.

1. immediately charging the batch container from a separate source of fermentation gases as opposed to sole reliance upon those gases evolved from the fermenting mixture; and 2. maintaining the fermentable mixture in a substantially frothed condition during a major portion of the winemaking process.

Although aerobically produced fermentation gases consist mostly of carbon dioxide, the objectives of the invention are not achieved by charging with $CO_2$ for the obvious reason that the anaerobically produced microorganism strains and acids upon which the present invention depends are not present and the product resulting from such effort is not palatable. As used herein, the term "anaerobic" is deemed to mean the substantial absence of elemental oxygen. Efforts to date have failed to uncover a suitable substitute for fermentation gases produced in a nonoxidizing atmosphere though it is theorized that if the same could be synthesized, the resultant wine would be palatable.

SUMMARY OF THE INVENTION

The fermentation of a large volume fermentable mixture is rapidly accelerated, following an initial evacuation of the apparatus, by the immediate introduction and maintenance in pressurized contact therewith, of fermentation gases from a prior anaerobic fermentation. The aging of the mixture is controlled by the volume of fermentation gases driven into solution with the fermentable mixture following the fermentation period with the volume control being exercised as a function of pressure control.

A large volume batch container which may comprise a sealed tank, vat or the like is first evacuated and the fermentable mixture therein is immediately pressurized with fermentation gases from a previous anaerobic winemaking process which has been collected and stored in a manner to be subsequently explained. The immediate pressurization of the tank and its contents serves two distinct functions in accelerating initial fermentation; viz. immediate catalyzation of the fermentation reaction as evolved gases are immediately driven into solution and violent agitation and frothing of the mixture as a closed cycle circulation is set up comprising the freshly evolving gases out of solution and the previously admitted gases into solution. It will be seen that the onset of each of these functions would be substantially delayed if only the fermentation gases from the fermenting batch were relied upon due to the substantial time delay in filling and pressurizing the large volume space above the mixture. Also, the fermentation reaction proceeds much more rapidly with an immediate, rather than a gradual, high pressure build up for the reason that the mixture is immediately frothed producing an exponential increase in surface area exposure.

The fermentation gases thus anaerobically produced include microorganism strains and intermediate acid formulations which appear to be far more unstable than those conventionally produced under aerobic conditions resulting in a greatly accelerated reaction rate. The reaction rate is further accelerated by the pressure addition of highly unstable fermentation gases from a previous anaerobic process which not only increases reaction rates as a function of pressure and reactant concentrations but, also, accelerates frothing rate of the mixture resulting in increased surface area exposure.

It has been found that the introduction of a gas containing elemental oxygen, e.g. air, at any point in the process between the commencement of fermentation and substantial completion of aging destroys the desired effect and results in an unpalatable wine. Based upon the data derived from three commercial winemaking operations conducted in accordance with the present invention, the need for initial evacuation and the subsequent maintenance of an anaerobic environment would appear to be explainable on the following bases:

1. It appears that the fermentation products of an anaerobic reaction are far more unstable than those of an aerobic fermentation exhibiting much greater reaction rates and intermediate combinations with other of the anaerobic fermentation products which would be below reaction threshold were reactive oxygen present. The initial evacuation is required to thus establish the anaerobic environment without which the higher reaction rates cannot be obtained and, also, to insure the absence of contamination by stray microorganisms or airborne wild yeast.

2. Since the time required for aerobic fermentation products to reach the desired end acid concentration (aging) is measured in years whereas the time required for anaerobic fermentation products to reach a required end acid concentration is measured in weeks; it will be appreciated that the presence of reactable oxygen at any point during the otherwise anaerobic process would immediately produce different oxygenated complexes with the highly unstable fermentation products and these oxygenated complexes would not proceed to their end acids at the same rate as the anaerobic products thus producing the taste of a young or underaged wine. Stated differently, contamination of the anaerobic process by oxygen defeats the purpose of the invention which is that of accelerated winemaking. In essence, the highly reactive anaerobic products are fed only pure other highly reactive fermentation products from a previous anaerobic reaction.

The need for maintaining an anaerobic environment is common to both the aforesaid home winemaker and the present commercial embodiment, however, a critical difference in the two processes, as mentioned above, is that of surface area exposure. In the case of a commercial sized device, it is necessary that pressure conditions obtain which insure that the fermentable mixture is maintained in a frothed condition at least until aging is substantially completed.

PRESSURE CONSIDERATIONS DURING FERMENTATION

As mentioned previously, it is desirable to evacuate the fermenter. It is clear that the degree of initial evacuation may vary but only at the low end of substantial evacuation, perhaps as a function of the particular type of wine being made. Thus, good results were obtained in a commercial Concord wine production with an initial evacuation of 20 inches Hg while the Burgundy process was commenced at an initial evacuation of 24 inches Hg.

Inasmuch as net mass flow of fermentation gases is across the liquid-gas interface out of the liquid, i.e. out of solution, during the initial fermenting portion of the wine making process, the pressure above the frothed liquid increases and, at preselected pressure limits, a portion of the pressurized gaseous volumn is pumped into a reservoir container. This process of reducing pressure in contact with the fermenting mixture is repeated so long as the pressure continues to rise to a preselected level. When the pressure in the fermenter ceases to increase, the equilibrium has shifted (net mass flow is back into solution as fermentation subsides), fermentation is substantially complete and the operative process becomes more nearly one of aging alone.

The preselected pressure level to be maintained (by bleeding to reservoir) during fermentation was first thought to be a single optimum value for each particular wine recipe and was thought to be a function of the desired volume of fermentation gases to be driven back into solution during the aging process. In operations of this type, the optimum pressure value will vary greatly with the particular type wine being made. For example, in the production of a Concord wine a relatively lower pressure (37/psig optimum) is employed whereas better results are achieved with Burgundy wines at higher pressures on the order of 70 psig. Although quite satisfactory results may be obtained by empirically determining a single preselected pressure to be maintained during fermentation, it will be apparent that the selected pressure, operating under these assumptions, is dictated by aging considerations and not by fermentation considerations.

It is now believed that the gaseous pressure in the fermenter may be varied during fermentation of a single batch in order to suppress the growth of undesired microorganisms, to promote the growth of desired microorganisms and/or to affect the evolution of either undesired or desired microorganisms in an advantageous manner. Since neither the exact organisms present in a particular grape or other wine constituent nor the effect thereof are known, the effect of pressure variations during fermentation can only be determined empirically. Accordingly, in accordance with this facet of the invention, it is desirable to make a multiplicity of small batches of wine, utilizing a common fermentable wine producing mixture; differently varying the fermentation pressures of the different batches; selecting the wine batch which is considered most desirable; and then making a large batch of wine from the same wine producing mixture in accordance with the parameters utilized in the making of the selected small batch. In this facet of the invention, it is necessary that the wine producing mixture utilized in the large batch is substantially identical to the mixture used in the small batches. Specifically, one cannot make the small batches from grapes from a particular area grown in one year and then make the large wine batch from the same grapes grown in a different year since grapes and the microorganisms thereon vary from year to year. It will be apparent that this approach is feasible only with rapid wine making techniques. Using conventional aerobic aging, many years may pass before one would know which small batch to select for duplication, an apparent fatal defect.

Although the selected pressure level or levels during fermentation may vary greatly, there are outer parameters beyond which the process is substantially impaired. At pressure levels below 10 psig insufficient frothing occurs while at pressures above 120 psig the fermentation process appears to substantially stop. Based upon commercial operations to date, the desired pressure range to be maintained during fermentation appears to fall between 20 psig and 70 psig.

PRESSURE CONSIDERATIONS DURING AGING

The aging process commences with the pressure contained gases being driven into solution and the degree of aging is a direct function of the gaseous volume driven back into solution. Although it appears that aging begins as soon as gases are reabsorbed, which clearly occurs before fermentation substantially stops, it seems that the bulk of aging occurs after the net mass flow of fermentation gases is back into solution. The purpose of pumping out a portion of the gaseous volume during the fermentation period was first thought to be twofold; to supply a reservoir of fermentation gases for a subsequent batch and to insure that the volume of fermentation gases remaining at the termination of the fermentation period is sufficient to insure proper aging but not so great as to produce over aging when the gas pressure and the batch container drop substantially to zero signaling the movement of substantially oil the gases in the container into solution. As pointed more fully hereinafter, absorption of fermentation gases need not be accompanied by a simple reduction of pressure in the unfilled volume of the fermenter. Accordingly, the twofold purpose of pumping out a portion of the gaseous volume during the fermentation period is now seen to be: to supply a reservoir of fermentation gases for a subsequent batch and to insure that a sufficient volume of fermentation gases is available to provide proper aging.

It was originally thought that the only proper control parameter for selecting aging pressure was to commence the aging period with a certain gaseous volume (as determined by pressure readings) in contact with the just fermented mixture and allowing the pressure reading to drop substantially to zero signaling completion of aging. Although this is an acceptable method, it has now been found that fermentation gases from the reservoir tank may be periodically pumped to the fermenter during the aging period to keep the pressure higher and further accelerate aging with process termination being determined by chemical analysis of end acid concentration or by taste. In the alternative, fermentation gases may be periodically pumped between the fermenter and reservoir tank to vary the aging pressure from below atmospheric to substantially above atmospheric to create different results in the end wine product.

It was originally considered that aging was due solely to the volume of fermentation gas reabsorbed by the wine. It is presently believed that the microorganisms still alive in the wine, which produce at least some of the end acids present in an aged wine, may be either suppressed or promoted in growth by pressure variations in much the same manner that microorganisms operative in the fermentation stage may be either suppressed or promoted. Accordingly, it is anticipated that one may make a multiplicity of small wine batches, using a common fermentable wine producing mixture; differently varying the gaseous pressure in the fermenten during aging, selecting a desired one of the small batches; and making a large batch of wine from the same wine producing mixture and utilizing the same parameters during aging that were used in the making of the selected small batch.

It is conceded that the practice of the prior patented invention inherently accelerates wine aging. There is, of course, no disclosure in U.S. Pat. No. 3,528,817 that aging occurs and a fortiori no disclosed technique for properly terminating aging. In accordance with this facet of the invention, aging may be terminated in response to sampling, e.g. chemical analysis of end acid concentration or tasting. In the alternative, one may make a plurality of small batches of wine; reabsorb different quantities of fermentation gases in the wine bottles; determine the required quantity of fermentation gases per liquid measure absorbed by the wine in order to substantially age the same, as determined by sampling; select a desired one of the batches; make a large batch of wine; and assure that the same quantity of fermentation gas is reabsorbed into the large wine batch on a liquid measure basis. By extrapolating the value obtained in making the small batch to take into account the larger wine volume in the large batch, one may terminate aging when the extrapolated quantity of fermentation gases has been absorbed.

For example, a number of small batches, e.g. 10–100 gallons, of wine are made with operations being conducted to assure that different quantities of fermentation gases are driven back into solution. Since the volume of the apparatus containing only gas is measurable, simple pressure readings thereon can be used to determine the quantity of reabsorbed gases. For example, if the selected batch were made in a 200 gallon fermenter half filled with liquid and connected to a 350 gallon gas reservoir with a maximum gas pressure of 37 psig, a minimum gas pressure of 8 psig and a relatively constant temperature of 74° F with no gas ingress or egress, the absorbed gas per liquid volume can be calculated as follows:

$$Vfg = (Vg + Vr)\left(\frac{\Delta Pg}{Pstd}\right)\left(\frac{Tstd}{Tg}\right)/Ve$$

$$= \left(\frac{100 \text{ gal} + 350 \text{ gal}}{5.61 \text{ gal/cf}}\right)\left(\frac{37 + 14.65 - 8 + 14.65}{14.65}\right)\left(\frac{520}{534}\right)/100 \text{ gal}$$

$$= \left(\frac{450}{5.61}\right)\left(\frac{43.65}{14.65}\right)\left(\frac{520}{534}\right)/100$$

$$= 2.33 \text{ cf/gal}$$

where Vfg = volume of fermentation gas reabsorbed, Vg = volume of fermenter less volume of liquid therein, Vr = volume of gas reservoir, ΔPg = difference in gas pressures in psia, Pstd = standard pressure at 14.65 psia, Tstd = standard temperature in °Rankine, Tg = gas temperature in °Rankine and Vl = volume of liquid.

It will be seen that the required quantity of gas to be driven back into solution is readily determinable. By conducting operations on the large batch to assure that the same quantity of fermentation gas per liquid measure is driven back into solution, the large and small wine batches will be substantially identical so long as other variables are maintained the same.

Although there is no specific disclosure thereof, the maximum pressure in the prior patented device is necessarily low because of the inherent nature of a resilient bladder. In the marketed version of the prior patented device, the pressure in the bladder at its maximum extension is on the order of 1–2 psig and declines to a value approximating atmospheric pressure at bladder collapse.

An aging pressure in excess of that afforded by the prior patented device is highly desirable for two reasons. First, a pressure above about 10 psig produces significant frothing of the wine thereby drastically increasing surface area contact between gas and liquid phases in the fermenter. Second, at any increased pressure, regardless of whether frothing occurs, the rate of fermentation gas absorption into the liquid phase is increased. A minimum aging pressure affording a significant increase in absorption rate, as opposed to the prior art patented device, appears to be 5 psig. It is assumed, although not verified, that a maximum aging pressure would depend upon the viability of microorganisms remaining in the wine at increased pressures. It is not yet known whether the aging process, like the fermentation process, substantially stops at some upper pressure limit.

In the foregoing and following discussion, it should be understood that the volume of the fermenting apparatus and the batch container itself is fixed. The reference to variable volumes of gas within the batch container refers to a gaseous volume calculated at some standard temperature and pressure, e.g. 14.65 psia and 60° F.

In addition to the manufacture of wines, champages may also be made anaerobically in accordance with this invention in the following manner. A fermentable wine producing mixture is placed in a container which is then evacuated. A fermentation gas may be used to charge the container to stimulate initial fermentation. In a large batch operation, pressure in the container is allowed to increase until frothing occurs.

After fermentation is substantially complete and aging is underway and is either partially or fully completed, the temperature of the container and the contents thereof are lowered, by suitable refrigeration techniques, to a selected value usually in the range of 22°–28° F, to increase the solubility of the wine for fermentation gases and to break the froth into a simple gas-liquid system with a defined interface. The liquid is then removed from the container and bottled under anaerobic conditions, i.e. without contacting air. The bottles are then sealed. Further significant aging may occur in the bottle, the extent of which depends on the condition of the wine at the time of bottling. Within a few weeks in the case of a partially aged wine or substantially immediately in the case of a fully aged wine, the champagne in the bottles is ready for serving. Since champagne is served at higher temperatures than 22°–28° F for example, removal of the seal and serving causes considerable fermentation gas to come out of solution giving the typical "bubbly" appearance and mouth of champagne.

In the alternative, after fermentation is substantially complete and aging is either partially or fully completed, the liquid is removed from the container and bottled under anaerobic conditons. The bottles are then sealed with a self sealing closure allowing the passage and removal of a needle while maintaining a seal. Fermentation gas is then injected into the bottle raising the pressure therein to, for example, 60 psig. Significant further aging may occur in the bottle, the extent of which depends on the condition of the wine at the time of bottling. Within a few weeks in the case of a partially aged wine or substantially immediately in the case of a fully aged wine, the champagne is ready for serving. Since removal of the seal and serving causes considerable fermentation gas to come out of solution the champagne has a typical "bubbly" appearance and mouth.

Another problem in the anaerobic production of wines is shelf life. In stark contrast to aerobically produced wines, which may have a shelf life in excess of 100 years and which almost always have a shelf life of at least a few years, anaerobically produced wines may have a shelf life measured in months. For example, the wine of Example 2, mentioned hereinafter, was exceptionally good when first removed from the fermenter. About 1 year later; the wine had developed an off odor and an odd taste which seemed to diminish somewhat on breathing of the wine after opening.

It has been suspected that oxygen mingling with the wine during handling between the fermenter and the bottle and/or oxygen present in the unfilled portion of the bottle allows aerobic aging of the wine to occur in the bottle. Although aerobic aging in the bottle is the essence of ultimately producing fine aerobically made wines, it is now clear that aerobic aging of anaerobically produced wines can be detrimental to shelf life, as shown in the following experiment.

Two identical batches of aged wine were anaerobically made with the marketed version of the prior patented device. One batch was left in the container under anaerobic conditions, i.e. only fermentation gases were exposed to the wine, while the other batch was left in the container under aerobic conditions, i.e. atmosphere air was allowed into the unfilled volume above the liquid. The wines were periodically sampled. After seven months storage, the anaerobically stored wine exhibited no detrimental change in taste, color or bouquet while the aerobically stored wine had developed a sour taste, a sour odor and a cloudy appearance.

Accordingly, in accordance with this aspect of the invention, the shelf life of an anaerobically produced wine is improved by substantially preventing aerobic aging of the wine in a storage container, e.g. a bottle. This is preferably accomplished by filling a container with an anaerobically produced wine under anaerobic conditions as by purging the container with an anaerobic gas and then delivering the wine into the container. In the alternative, the container may be filled with an anaerobically produced wine followed by purging of the unfilled volume of the container with an anaerobic gas. Alternatively, the container may be substantially evacuated followed by immediate filling thereof with the wine and an anaerobic gas.

The anaerobic gas used for purging should be essentially odorless and tasteless. It should also be non-reactive at the pressure and temperatures existant in the container during storage thereof at least to the extent of not deleteriouly effecting the odor, taste or appearance of the wine therein. Many anaerobic gases are operatable including an inert gas, such as argon, neon and the like, carbon dioxide, nitrogen, and anaerobically produced fermentation gas and combinations thereof. Desirably, the selected anaerobic gas has a specific gravity greater than air so that the container may be purged with the container opening facing upwardly thereby allowing gravity to maintain the heavier anaerobic gas in the container and prevent air migration thereinto. The preferred anaerobic gas is an anaerobically produced fermentation gas which allows subsequent anaerobic aging to occur, however minute.

DESCRIPTION OF THE DRAWING

FIG. 1 is a schematic illustration of commercial winemaking apparatus for practicing the present invention; and FIG. 2 is a schematic illustration of anaerobic bottling.

DESCRIPTION OF THE PREFERRED EMBODIMENT

The winemaking apparatus shown in FIG. 1 comprises a large capacity batch container 10 whose hollow interior above the level of a fermentable mixture 12 may be selectively intercommunicated with a pair of reservoir tanks 14, 16 and an evacuation line 18 via manifold 20. Each reservoir tank is interconnected with manifold 20 via parallel branch conduits 22, 24 and 26, 28 respectively. Each branch conduit 24, 28 includes a valve 30, 32 intermediate a compressor 34, 36 and manifold 20 while each branch conduit 22, 26 includes a valve 38, 40. Similarly, a valve 42 and vacuum pump 44 are interposed between evacuation line 18 and manifold 20. Each reservoir tank 14, 16 includes a pressure gauge 46, 48 and vent lines 50, 52 controlled by valves 54, 56. Vacuum and pressure gauges 58, 60, in open communication with manifold 20, monitor the pressure conditions of the apparatus within batch container 10 and on the manifold side of valves 30, 32, 38, 40, 42.

The presence of a fluid tight hatch 62 adjacent the lower end of container 10 to permit of personnel entry for cleaning purposes, a removable fluid tight fill opening 64 and a valved spigot 66 complete the description of the apparatus.

In an exemplary mode of operation with any fermentable mixture 12, such as that recipe disclosed in U.S. Pat. No. 3,258,817 for example, having just been placed in container 12 through fill opening 64 and the same sealed and substantially atmospheric pressure conditions prevailing in the space 68 above mixture 12, and all of valves 30, 32, 38, 40 and 42 closed; valve 42 is opened and vacuum pump 44 started. The apparatus is then evacuated to a desired low pressure condition which, in accordance with the exemplary parameters recited herein, may comprise a pressure of 0.1 atmosphere as will be observed from vacuum gauge 58. Valve 42 is then closed and pump 44 shut down. Assuming that reservoir tank 14 has been previously pressurized with evolved fermentation gases from a previous anaerobic winemaking operation to a pressure in excess of 70 psig as will be subsequently explained; valve 38 is opened and the compressed gases in container 14 are allowed to enter manifold 20 and batch container space 68 until the pressure buildup reaches approximately 40 psig as indicated by pressure gauge 60. Valve 38 is then closed. The pressurized fermentation gases violently froth the mixture and catalyze the fermentation reaction in container 10. It should be clearly understood that net mass flow, during the fermentation period, is out of solution with much more presently evolving gas entering space 68 than entering into solution with the mixture. This, in effect, sets up a closed gas circulation cycle with pressure in space 68 constantly increasing during the fermentation period. The result is violent frothing and agitation of the mixture with concomitant increased surface area exposure for the lesser partial pressures across the gas-liquid interface to drive more fermentation gases into solution. For the particular exemplary parameters recited herein and wherein batch container 10 having a filled capacity of 200,000 gallons is half filled; a gas pressure of approximately 50 psig represents that volume of gas which when driven back into solution during the aging period, will produce an appropriately aged wine which does not exhibit any of the characteristics of an overaged wine. Accordingly, during the fermentation period which may last for several days, pressure gauge 60 is monitored and as soon as the pressure starts to exceed approximately 50 psig, valve 32 is opened and compressor 36 is started to pump fermentation gases from batch container 10 into reservoir container 16 which may already be pressurized to some extent from a previous operation. When pressure gauge 60 drops to or just below 50 psig, valve 32 is closed and compressor 36 shut down. So long as the fermentation reaction is proceeding, net mass flow continues into space 68 and the delivery of fermentation gas to the reservoir tank 16 with the concomitant pressure reduction of batch container 10 is repeated to maintain pressure therein at approximately 50 psig.

The figure of 50 psig is given as one exemplary pressure that has been employed, however, the critical aspect in a large volume batch operation, insofar as pressure is concerned, is that pressure be maintained sufficiently high to insure that the mixture is maintained in a frothed condition.

As soon as the primary fermentation period is complete, as will be signalled by a failure of pressure to again rise; the aging period has commenced as will be evidenced by a drop in pressure at pressure gauge 60 as net mass flow is now back into solution. In one method of use no further manipulation of the equipment is necessary until the pressure drops to a predetermined low reading which is typically something less than one atmosphere. At that time, that volume of gas represented by the 50 psig reading at the time the net mass flow equilibrium shifted has been driven into solution to complete the aging process. The wine may then be drawn off at spigot 66 and is ready for consumption.

Alternatively, pressure may be maintained in container 68 at any desired level (such as maintaining at 50 psig by periodic introduction from reservoir) to further accelerate the aging process until chemical analysis or tasting reveals the desired end acid concentration at which time the process is terminated by pumping down space 68 to reservoir and allowing frothing to subside.

The container 10 may, if desired, be cleaned prior to the next winemaking operation by personnel access through hatch 62. The same procedure is followed for the next batch as that just described except that the initial pressurization of batch container 10 is effected by opening valve 40 to admit fermentation gases from the newly pressurized reservoir tank 16. Subsequently, compressor 34 is operated to repressurize tank 14 as the fermentation gas pressures exceed 50 psig in order to prepare that tank for the next succeeding batch.

The pressure gauges 46, 48 and valved vent lines 50, 52 on reservoir tanks 14, 16 are to permit bleeding the same to a desired pressure level in excess of approximately 60 psig if the pressures therein start to exceed certain maximums as would be dependent upon the size and construction of the tanks.

Although the invention has been described as being manually controlled as by visual monitoring of the various gauges and manual manipulation of the valves and pumps; it will be apparent that the entire process could be automated in an obvious manner. Thus, for example, gauges 58, 60 could be replaced with pressure sensitive switches to control valve and pump motor operation.

For initial operations with a particular batch recipe which has not been previously subjected to the accelerated process described herein; it is desirable to decrease the volume of gases driven back into solution on the first batch, such as by monitoring to maintain a lower batch container pressure, so that any possibility of overaging is precluded. When the aging process, commencing from the lower pressure level, is complete; a sample can be withdrawn and tested. If it is underaged, more pressure may be admitted from one of the tanks and the sampling repeated to empirically determine the precise pressure condition to produce the desired age for a particular batch recipe.

Although a substantial increase in the overall winemaking time would result if the large volume batch 12 were not pressurized with an outside source for the reasons already enumerated; a wine which is substantially as palatable can be had in the absence of such outside pressurization though a time period in excess of a few weeks would be required. Nevertheless, it is possible to rely solely on those gases evolving from batch 12 to effect an accelerated winemaking period which will still be far less than the years required by conventional winemaking processes. In this latter event, it will be necessary to effect controlled pressure bleeding, as by a pressure relief valve for example, to insure that overaging does not occur.

ADDITIONAL EXAMPLES

1. Ingredients:

44 gallons of Wine Art red blend concentrate
175 lbs. of white granulated sugar
50 packages of Wine Art champagne yeast
 (1 pkg good for 1-5 gallons of wine)
7 bottles of Wine Art tannin
 (1 bottle good for 25 gallons of wine)
tap water to produce 175 ± 5 gallons of must
30 packages (¼ oz) Fleishman's dry powdered yeast Pressure Control:

a. Evacuate to 22.5 inches Hg, set compressor control to begin withdrawing gas from fermenter at 15 psig and turn off at 12 psig, and run. Compressor difficulties occured almost immediately, pressure bled off manually but allowed to run gradually to a maximum of 93 psig although must fermentation in range of 30–85 psig. Pressure 75 psig at shift of net mass flow on 16th day. At 30th day fermenter pressure down to 39 psig. Pressure down to 8 psig on 56th day.

Observations:

a. Must and wine frothy throughout.
b. Fermentation apparently complete by 16th day.
c. Resultant wire measured 11.5% alcohol, tastes sweet, bouquet good. Estimated completion on 30th day.

2. Ingredients:

26 gallons of Wine Art red burgundy concentrate
1 gallon of Wine Art rose concentrate
2 gallons of Wine Art red burgundy blend
65 lbs. of white granulated sugar
35 packages of Wine Art general purpose yeast
 (1 pkg good for 1-5 gallons of wine)
3 bottles of Wine Art tannin
 (1 bottle good for 25 gallons of wine)
tap water to produce 106 gallons of must
S.G. = 1.110

Pressure and Temperature Controls:

a. Evacuate to 20 inches Hg, initial temperature = 80°–82° F, set heating coil to turn on at 72° F and off at 75° F, set compressor control to begin withdrawing gas from fermenter at 5.5 psig and turn off at 4.0 psig and run for 15 days. Compressor difficulties occured between 3rd and 5th days, pressure in fermenter rose to 70 psig by end of 5th day, periodically bled off pressure to 5 psig with fermenter pressure between 5–18 psig, compressor operating normally by 10th day.
b. On 16th day raise and maintain gas pressure in fermenter to 24 psig.
c. At end of aging, decrease pressure to atmospheric to break foam.

Observations:

a. Almost immediately, at start of fermentation, must became a heavy foam (fermenter pressure 5 psig) throughout, i.e. at top and bottom of fermenter.
b. Fermentation apparently substantially complete by end of 10th day.
c. Resultant wine measured 12.8% alcohol, tasted smooth and dry. Looked slightly cloudy on 37th day, was clear by 72nd day. Estimated completion at 45th day.

Referring to FIG. 2, there is illustrated a bottling line 68 comprising an endless conveyor belt 70 supported by a multiplicity of rollers 72. A plurality of bottles 74 are carried by the conveyor 70 sequentially passed a purging station 76, a filling station 78 and a sealing station 80.

At the purging station 76, a tube 82 is extended into the bottle 78 for delivering an anaerobic gas into the bottle 74 and purging air therefrom. Following removal of the tube 82, the bottle is transported to the filling station 78 where a tube 84 is extended into the bottle 74 for delivering an anaerobically produced wine thereinto. Following withdrawal of the tube 84, the bottle 74 is transported to the sealing station 80 where a suitable seal attaching member 82 affixes a seal 84 to the bottle 74, which is partially filled with liquid with the remaining volume thereof being occupied by an anerobic gas. anaerobic

I claim:

1. A method of fermenting and aging a fermentable mixture, comprising; introducing a volume of fermentable mixture into a larger volume batch container; sealing said container with respect to atmosphere; removing the atmosphere from the unfilled volume of said container and substantially instantaneously pressurizing said unfilled volume with fermentation gases, independent from said fermentable mixture, to an accelerating pressure level substantially greater than one atmosphere to accelerate a primary fermentation reaction exhibiting net mass flow of fermentation gases from said mixture into said unfilled container volume; allowing said primary fermentation reaction to proceed and increase the gaseous pressure within said container above the lower limits of an aging pressure range above said accelerating pressure level; steps for maintaining said gaseous pressure in said container within said aging pressure range during said primary fermentation reaction; said steps including periodically reducing said gaseous pressure as the same approaches the upper limit of said aging pressure range; continuing said steps until termination of said primary fermentation is exhibited by a shift of net mass fermentation gas flow from said unfilled container volume into said mixture; terminating the reduction of gaseous pressure within said aging pressure range; maintaining said container sealed with respect to atmosphere; steps for accelerating aging of said mixture; said last named steps including allowing the fermentation gases within said unfilled container to be driven into said mixture and decrease the gaseous pressure within said container below said accelerating pressure level; and continuing said last named steps until the pressure in said container drops substantially below one atmosphere.

2. A method of accelerating the fermentation and aging of a fermentable mixture, comprising; introducing a volume of fermentable mixture into a large volume batch container; sealing said container against ingress of atmosphere; removing substantially all atmosphere from the unfilled volume of said container and charging the same from an external source of fermentation gas up to an accelerating pressure level to accelerate a primary fermentation reaction exhibiting net mass flow of fermentation gases from said mixture into said unfilled container volume; terminating the external charging of said container; allowing the primary fermentation reaction to proceed and increase gaseous pressure within said container above the lower limit of an aging pressure range lying above said accelerating pressure level; steps for maintaining the gaseous pressure in said container within said aging pressure range while said primary fermentation reaction is proceeding; said steps including reducing said gaseous pressure as the same approaches the upper limit of said aging pressure range and terminating the reduction of gaseous pressure as the same approaches said lower limit of said aging pressure range; continuing said steps until termination of said primary fermentation reaction is exhibited by a shift of net mass fermentation gas flow from said unfilled container volume into said mixture; maintaining said container sealed with respect to atmosphere; steps for accelerating aging of said mixture within said sealed container; and said last named steps comprising maintaining said container sealed and allowing fermentation gases within said container to be driven into said mixture and decrease the gaseous pressure therein substantially below said aging pressure range to substantially below atmospheric pressure.

* * * * *